United States Patent
Zloth et al.

(10) Patent No.: US 8,346,671 B2
(45) Date of Patent: Jan. 1, 2013

(54) SYSTEM AND METHOD FOR POINT-TO-POINT ENCRYPTION WITH ADJUNCT TERMINAL

(75) Inventors: Susan Zloth, Castle Rock, CO (US); Daniel Lane, North Potomac, MD (US); Benjamin Smyth, Spring Grove, PA (US)

(73) Assignee: Merchant Link, LLC, Silver Spring, MD (US)

( * ) Notice: Subject to any disclaimer, the term of this patent is extended or adjusted under 35 U.S.C. 154(b) by 236 days.

(21) Appl. No.: 12/752,806

(22) Filed: Apr. 1, 2010

(65) Prior Publication Data

US 2011/0246372 A1    Oct. 6, 2011

(51) Int. Cl.
*G06Q 20/00*    (2012.01)
*G06F 21/00*    (2006.01)

(52) U.S. Cl. .................. 705/75; 705/64; 705/67; 902/2; 902/22; 902/25; 902/27; 902/40

(58) Field of Classification Search .................... 705/64, 705/67, 75, 14.38; 902/2, 22, 25, 27, 40
See application file for complete search history.

(56) References Cited

U.S. PATENT DOCUMENTS

| | | | |
|---|---|---|---|
| 5,978,918 A | 11/1999 | Scholnick et al. | |
| 6,332,193 B1 | 12/2001 | Glass et al. | |
| 6,560,709 B1 | 5/2003 | Galovich | |
| 6,598,031 B1* | 7/2003 | Ice | 705/50 |
| 6,938,019 B1 | 8/2005 | Uzo | |
| 6,938,022 B1 | 8/2005 | Singhal | |
| 6,990,470 B2 | 1/2006 | Hogan et al. | |
| 7,082,415 B1 | 7/2006 | Robinson et al. | |
| 7,376,629 B1 | 5/2008 | McIsaac et al. | |
| 7,512,236 B1 | 3/2009 | Zhu | |
| 2002/0007320 A1 | 1/2002 | Hogan et al. | |
| 2002/0022967 A1 | 2/2002 | Ohkado | |
| 2002/0133467 A1 | 9/2002 | Hobson et al. | |
| 2002/0180584 A1* | 12/2002 | McGregor et al. | 340/5.26 |

(Continued)

FOREIGN PATENT DOCUMENTS

KR    10-2007-0117420 A    12/2007

(Continued)

OTHER PUBLICATIONS

Shift4 Releases New Technology to Insure the Security of its Merchants' and Partners' Payment Processing, Tokenization Moves the Liability for Securing Credit Card Data Away from Merchants' and POS Application Developers, Las Vegas, Nevada, Oct. 5, 2005, 2 pgs.

(Continued)

*Primary Examiner* — James A Reagan
*Assistant Examiner* — Calvin Cheung
(74) *Attorney, Agent, or Firm* — Jackson Walker L.L.P.; Christopher J. Rourk

(57) ABSTRACT

A system for point-to-point encryption is provided. A card reader system reads unencrypted card data stored on a magnetic stripe of a card and encrypts the card data, the card reader system being contained in a first housing. A point of sale device coupled to the card reader system and contained in a second housing separate from the first housing has a user interface for obtaining a transaction amount. A transaction request system transmits the transaction amount and the encrypted card data to an authorization gateway, wherein the unencrypted card data is prevented from being processed by the point of sale device.

16 Claims, 4 Drawing Sheets

U.S. PATENT DOCUMENTS

| | | | |
|---|---|---|---|
| 2002/0191020 A1 | 12/2002 | Kaply et al. | |
| 2003/0046237 A1 | 3/2003 | Uberti | |
| 2003/0061171 A1 | 3/2003 | Gilbert et al. | |
| 2004/0070566 A1* | 4/2004 | Ashton | 345/156 |
| 2004/0073688 A1 | 4/2004 | Sampson | |
| 2004/0172309 A1 | 9/2004 | Selwanes et al. | |
| 2004/0182921 A1* | 9/2004 | Dickson et al. | 235/380 |
| 2004/0210449 A1 | 10/2004 | Breck et al. | |
| 2007/0005511 A1* | 1/2007 | Martinez | 705/67 |
| 2007/0023504 A1* | 2/2007 | Blankenship et al. | 235/380 |
| 2008/0017712 A1* | 1/2008 | Hart et al. | 235/449 |
| 2008/0215887 A1* | 9/2008 | Hart et al. | 713/172 |
| 2009/0327701 A1* | 12/2009 | Holz | 713/155 |

FOREIGN PATENT DOCUMENTS

| | | | |
|---|---|---|---|
| KR | 10-2009-0124137 A | | 12/2009 |
| KR | 10-2010-0006004 A | | 1/2010 |
| WO | WO2006119253 A2 * | | 11/2006 |

OTHER PUBLICATIONS

Mark, Heather, Storing Credit Card Data, A Look at the Business Needs, Regulations and Solutions Surrounding the Issue, CISSP, Jan. 2006, 44 pgs.

Letter from Michael J. Andelson of Best Best & Krieger LLP to Christopher Justice, President, Merchant Link, LLC and Michael P. Duffy, Chief Executive Officer of Chase Paymentech Solutions, LLC, dated Dec. 14, 2006, 4 pgs.

United States Patent and Trademark Office, International Search Report and Written Opinion, PCT Application No. PCT/US2006/016745, Jun. 18, 2007, 8 pgs.

Canadian Patent Office, Office Action, Patent Application No. 2,606,183, Jan. 28, 2011, 4 pgs.

Korean Intellectual Property Office; International Search Report and Written Opinion; PCT Application No. PCT/US2011/030946; Nov. 16, 2011.

* cited by examiner

SYSTEM AND METHOD FOR POINT-TO-POINT ENCRYPTION WITH ADJUNCT TERMINAL

FIELD OF THE INVENTION

The invention relates to providing point-to-point encryption, and more particularly to a system and method for point-to-point encryption that uses an adjunct terminal to replace data reading equipment on a standardized terminal configuration.

BACKGROUND OF THE INVENTION

Equipment for reading sensitive information is known in the art. Such equipment includes employee identification badge readers, credit card readers, and bar code readers, and the sensitive information read by each different type of reader is used to control access to the information that is being read.

Unauthorized persons often attempt to obtain such sensitive information, such as by reading the device, so as to use the sensitive information for improper and unauthorized purposes. In the U.S. alone, billions of dollars are lost every year to fraudulent activity involving the unauthorized use of sensitive information, despite ongoing attempts by numerous parties to prevent such losses.

SUMMARY OF THE INVENTION

A system and method for point-to-point encryption with an adjunct terminal are provided that eliminate access to sensitive information by corruption of common readers that are used for reading devices that store sensitive information. In particular, a system and method for point-to-point encryption with an adjunct terminal are provided that can be used with a point of sale device and a credit card magnetic card reader.

DETAILED DESCRIPTION OF PREFERRED EMBODIMENTS

Figure 1:
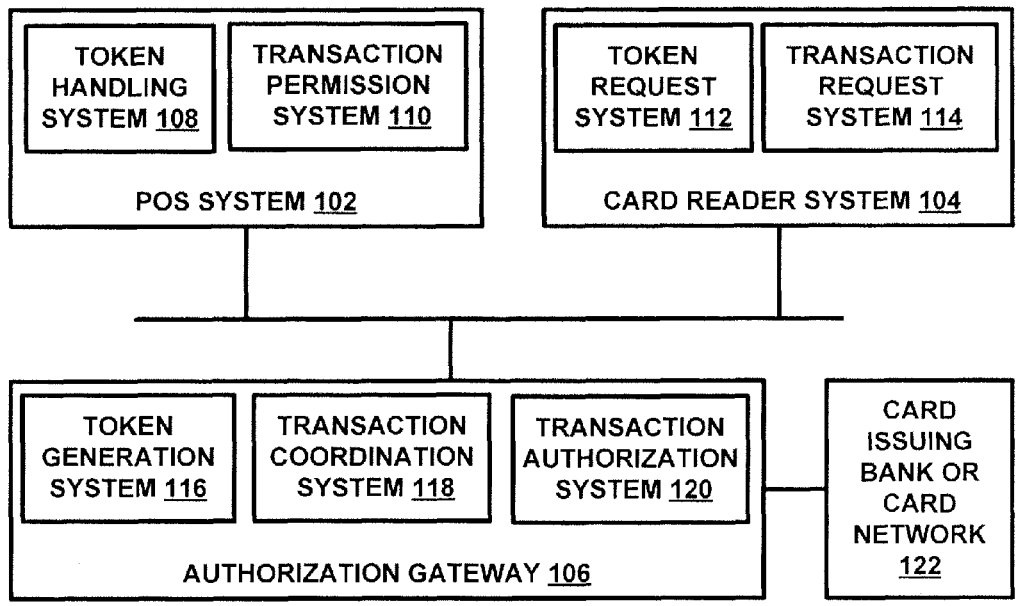
FIG. 1 is a diagram of a system for secure transaction processing in accordance with an exemplary embodiment of the present invention.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for secure transaction processing in accordance with an exemplary embodiment of the present invention. System 100 provides an architecture that separate a card reader system from a point of sale device so that the point of sale device cannot be compromised to extract unencrypted magnetic card stripe data.

System 100 includes point of sale device 102, card reader system 104 and authorization gateway 106 and their associated component systems, each of which can be implemented in hardware or a suitable combination of hardware and software, and which can be one or more software systems for operation on a platform such as a point of sale card reader platform, a general purpose processing platform, or other suitable platforms. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application. Card reader system 104 can provide magnetic card stripe reader functionality such as is normally found on a point of sale device. Authorization gateway 106 can be a credit card authorization gateway used by a merchant for authorization of transactions, tracking of transaction data, and other suitable purposes. As used herein, a credit card refers to any suitable payment device, such as a credit account card, a debit account card, a stored value card, a wireless device that stores account data for a payment account, or other suitable devices or accounts for performing transaction payment without currency.

Point of sale device 102 can be a general purpose computer, a dedicated point of sale device that includes a processor, data memory, one or more data ports, or other suitable devices. Point of sale device 102 includes token handling system 108 and transaction permission system 110, which are used to interface with card reader system 104 and authorization gateway 106. Token handling system 108 receives a token from authorization gateway 106 and allows a transaction to be requested. In one exemplary embodiment, token handling system 108 can store the token, and can generate a transaction permission request or other suitable data that is used by transaction permission system 110 to allow a transaction to proceed.

Transaction permission system 110 receives a token, a transaction permission request, or other suitable data from token handling system 108 or other suitable systems and generates transaction data. In one exemplary embodiment, transaction permission system 110 can receive a transaction identifier from authorization gateway 106 or token handling system 108 that is associated with a token request from a card reader system 104 and can include that transaction identifier with transaction data that is transmitted to authorization gateway 106, so that the card read by card reader system 104 can be associated with the transaction at point of sale device 102. In this exemplary embodiment, authorization gateway 106 transmits the transaction identifier to point of sale device 102 that is associated with a card reader system 104 in response to receiving encrypted or tokenized credit card data from the card reader system 104. In another exemplary embodiment, transaction permission system 110 receives the transaction identifier in addition to a token that is received by token handling system 108, such as from an authorization gateway 106 in response to credit card data received from a card reader system 104 associated with point of sale device 102, and uses the transaction identifier and the token to request authorization, so that the card read by card reader system 104 can be associated with the transaction at point of sale device 102. Likewise, other suitable types of data and processes can be handled by transaction permission system 110 to coordinate the operation of card reader system 104, point of sale device 102 and authorization gateway 106.

Token request system 112 of card reader system 104 generates token requests based upon magnetic card data read from a magnetic card stripe reader device. In one exemplary embodiment, token request system 112 can read card data encoded in a magnetic data storage media of a credit card, encrypt the card data, and include the encrypted card data in the token request so that the authorization gateway 106 or other suitable systems can determine whether the card data is from a valid credit card, whether to generate a preliminary authorization confirmation, whether to authorize the amount of a transaction, or for other suitable purposes.

Transaction request system 114 requests a transaction identifier from authorization gateway 106. In one exemplary embodiment, transaction request system 114 can generate an identifier associated with point of sale device 102, such as a time, point-of-sale device identification number or other suitable data that allows the transaction associated with a credit card that has been read by card reader system 104 to be associated with a subsequent transaction authorization request. In this exemplary embodiment, a purchaser presents a credit card for payment, and the credit card data encoded in the magnetic media of the credit card is read by a card reader device. The card data is then encoded in a token request, and the token request is transmitted with a transaction identifier, which can also be provided to point of sale device 102, either directly (through a wireless or wire line connection) or indirectly (such as by transmitting the transaction identifier to point of sale device 102 through authorization gateway 106 in combination with the token request and the subsequent token). Likewise, transaction request system 114 can include certain preset flags, such as a ceiling limit of a certain predetermined dollar amount that is automatically assigned, entered by a user or provided in other suitable manners, so that an initial preliminary authorization of a transaction amount for the account associated with the credit card that has been read by card reader system 104 can be performed.

Authorization gateway 106 is coupled to point of sale device 102 and card reader system 104 over a communications medium, such as the Internet, the public switched telephone network or other suitable communications media. Authorization gateway 106 receives a token request, a transaction request and other suitable data from card reader system 104. In response to the token request, token generation system 116 decrypts the encrypted card data and performs authorization by determining whether the credit card associated with the card data is a valid credit card. In one exemplary embodiment, authorization can include evaluation of the credit card number by checking number fields to determine whether they include invalid numbers in any fields, comparing the credit card number against a watch list of stolen credit cards, submission of the credit card number to the associated credit card network for authorization by the network or the card issuing bank, or other suitable processes can be performed. Because of the volume of credit card transactions, these authorization processes are performed by algorithms operating on general purpose processing platforms or by special purpose computers that are optimized for authorization processing.

Transaction coordination system 118 generates a transaction identifier to be transmitted to transaction permission system 110. In one exemplary embodiment, transaction coordination system 118 receives a transaction request from transaction request system 114, determines the identity of the associated point of sale device (such as from an identifier included in the transaction request or from a list identifying a point of sale device associated with transaction request system 114), determines whether to perform preauthorization of a fixed amount, determines whether additional authorization processing by transaction authorization system 120 is required, or whether other suitable transaction coordination processes should be performed. Transaction coordination system 118 can coordinate with a credit card network or card issuing bank, such as to flag a transaction as requiring contact with the card issuing bank and authorization for a predetermined amount or other suitable processes.

Transaction authorization system 120 receives transaction data from point of sale device 102 and performs transaction authorization processing. In one exemplary embodiment, system 100 can be used with point of sale terminals in locations such as fast food restaurants, gas stations, or other locations where the amount of purchase is typically below a predetermined ceiling amount, and authorization of that amount can be initially performed at the point in the transaction processing where a token is initially requested. In another exemplary embodiment, transaction authorization system 120 can receive a transaction amount from point of sale device 102 after point of sale device 102 receives a preliminary authorization indication, a token, or other suitable data, and can request authorization to charge a card holder's account for that transaction amount from the card issuing bank, the credit card network or other suitable systems. Likewise, other suitable transaction processes can be performed.

Card issuing bank or card network 122 perform authorization processing for a transaction amount and a credit card account number. In one exemplary embodiment, card issuing bank or card network 122 can be a card issuing bank, a credit card authorization network, a combination of a card issuing bank and a credit card authorization network, a debit network, the automated clearing house (ACM), a prepaid or stored value card services provider or other suitable systems that provide a secured approval for a transaction authorization request such that payment of the transaction amount is guaranteed by a party associated with the system.

In operation, system 100 is used to provide secure and separate magnetic credit card stripe reading functionality for point of sale devices, such as existing point of sale devices that already include a magnetic credit card stripe reader that is to be bypassed, point of sale devices that do not have a magnetic credit card stripe reader, or other suitable systems. System 100 uses a separate card reader system 104 that is connected to an authorization gateway 106 over a communications medium, and which is typically placed next to or in the vicinity of point of sale device 102. The user of point of sale device 102 receives a card from a purchaser and scans the card through card reader system 104. Card reader system 104 then transmits a token request to authorization gateway 106, so as to remove point of sale device 102 from having access to the magnetic card data. Because magnetic card stripe data security through point of sale devices has been compromised, the use of card reader system 104 to perform card reading eliminates the need for point of sale device 102 to access the data stored in the magnetic stripe of credit cards. The encryption performed by card reader system 104 and other security processes performed between card reader system 104 and authorization gateway 106 can be updated as needed, independently controlled and proprietary, so as to minimize the risk of exposure of the technology of card reader system 104 to third parties, reverse engineering and "hacking" of card reader system 104 by third parties to allow for unauthorized extraction of credit card data, and prevention or mitigation of other risks.

Existing point of sale devices can be modified to interface with tokens generated by token generation system 116. In this exemplary embodiment, point of sale device 102 may require a software download or other upgrades or updates in order to interface with authorization gateway 106, so as to exclude magnetic card data read by point of sale device 102 and to only utilize magnetic card data read by card reader system 104. Additional security functionality can also be provided, such as de-activation of any card reader present in point of sale device 102, the use of any such card reader for other purposes (such as to generate an alert if a user is attempting to use that card reader to read magnetic stripe data of a credit card), or other suitable functionality.

Figure 2:
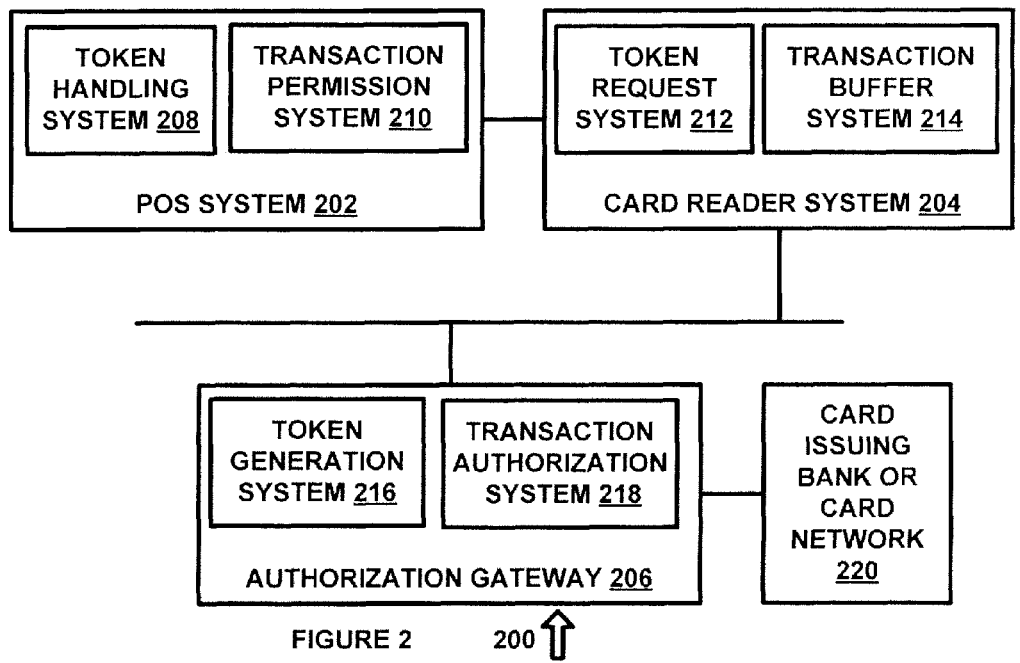
FIG. 2 is diagram of system for processing transaction data in accordance with an exemplary embodiment of the present invention.

FIG. 2 is diagram of system 200 for processing transaction data in accordance with an exemplary embodiment of the present invention. System 200 includes point of sale device 202, card reader system 204, and authorization gateway 206, each of which can be implemented in hardware or a suitable combination of hardware and software, and which can be one or more software systems for operation on a general purpose processing platform, a special purpose processing platform or other suitable platforms.

Point of sale device 202 includes token handling system 208 and transaction permission system 210. Token handling system 208 generates a token request or other suitable data when a transaction is presented for authorization. Likewise, transaction permission system 210 reads the transaction data such as the items being purchased, the amount, and other suitable data, and generates a transaction authorization request. This transaction authorization request is transmitted to card reader system 204.

Card reader system 204 includes token request system 212 and transaction buffer system 214. In one exemplary embodiment, point of sale device 202 can insert a predetermined block of data that is detected and extracted by card reader system 204 or transaction buffer system 214. In this exemplary embodiment, an operator of point of sale device 202 can scan a user identification card using a magnetic card reader on point of sale device 202, and point of sale device 202 can generate an authorization request using existing point of sale device 202 software where the user identification card data is used to replace the field in the authorization request where the magnetic card stripe data from a presented credit card would normally be encoded. Card reader system 204 receives the authorization request, identifies the user identification card data where the magnetic card stripe data would normally be encoded, and extracts the magnetic card stripe data and replaces it with encrypted magnetic card stripe data. In this exemplary embodiment, card reader system 204 allows an existing point of sale device 202 to be utilized but provides additional encryption security by excluding point of sale device 202 from accessing the magnetic card stripe data of the presented credit card. Token request system 212 can be used to process the encrypted card data and add additional identifiers, such as to allow authorization gateway 206 to confirm that card reader system 204 has generated or requested an authorization. Transaction buffer system 214 can be used to store the authorization request in a predetermined field format, where the user identification card data or other field is identified for extraction and replacement with the scanned credit card and encrypted credit card data.

Authorization gateway 206 includes token generation system 216 and transaction authorization system 218. Because the transaction authorization request is received with an encrypted token request, it is unnecessary to coordinate the transaction with point of sale device 202 as in system 100, such that token generation system 216 can decrypt the token request and provide the decrypted credit card number to transaction authorization system 218 with the amount of the transaction. Transaction authorization system 218 can perform authorization processing in conjunction with card issuing bank or a card authorization network 220 or other suitable systems and receive authorization for charging the transaction amount against the associated card. The transaction authorization is then transmitted to card reader system 204 and the authorization with the token instead of a credit card account number is transmitted to point of sale device 202, which can track the transaction and perform additional merchant-related processes utilizing the token instead of the credit card account number, so that the credit card data is never received by point of sale device 202. Transaction permission system 210 can then allow the transaction to proceed.

In operation, system 200 allows an existing point of sale device to interface with a separate card reader system, such as where the card reader system is placed between point of sale device 202 and a communications medium for connecting point of sale device 202 to an authorization gateway 206. In this exemplary embodiment, card reader system 204 receives the authorization and transaction data and then adds the credit card data in an encrypted format so as to exclude point of sale device 202 from ever receiving credit card data. Card reader system 204 can be proprietary and can be modified or updated as needed by authorization gateway 206 or other parties so as to ensure that the integrity of the encryption mechanism used to encrypt credit card account number data is maintained, and to prevent unauthorized third party access to the credit card account number data.

Figure 3:
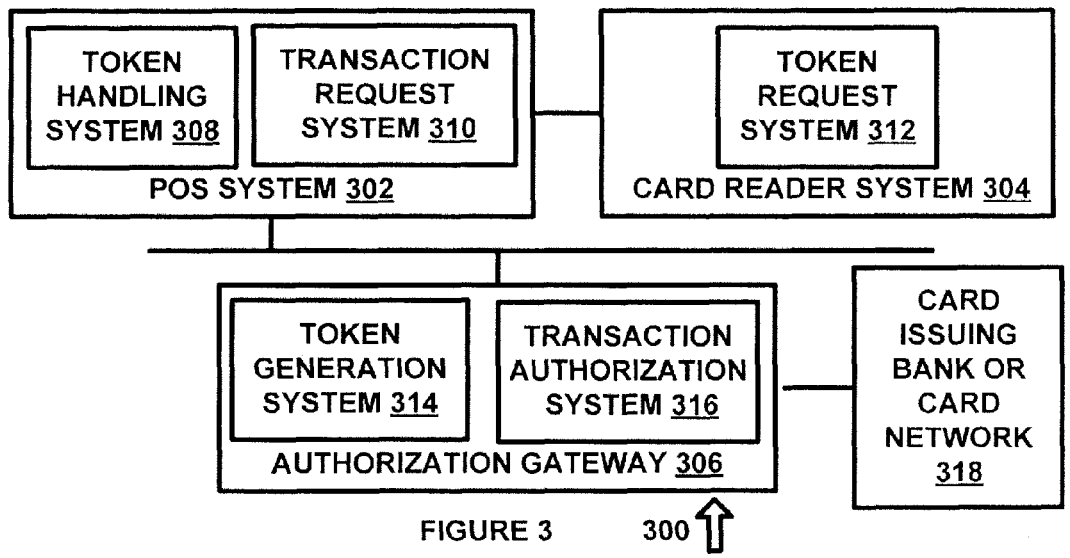
FIG. 3 is a diagram of a system for generating a token request in accordance with an exemplary embodiment of the present invention.

FIG. 3 is a diagram of a system 300 for generating a token request in accordance with an exemplary embodiment of the present invention. System 300 includes point of sale device 302, card reader system 304, and authorization gateway 306, each of which can be implemented in hardware or a suitable combination of hardware and software, and which can be one or more software systems for operation on a general purpose processing platform, a special purpose processing platform or other suitable platforms.

In this exemplary embodiment, card reader system 304 is used to read a magnetic stripe of a credit card, and token request system 312 generates a token request that includes encrypted credit card account number data for the token request. Point of sale device 302 includes token handling system 308 and transaction request system 310, which are configured to detect a token request from token request system 312 and to generate transaction data. In this exemplary embodiment, card reader system 304 interfaces with point of sale device 302 through an interface, such as a USB port, an RS232 port, other suitable ports, a wireless interface such as an 802.1x device, or other suitable interfaces, and point of sale device 302 then performs standard transaction authorization request processing using the token instead of a data read from a magnetic card stripe of a credit card.

Authorization gateway 306 includes token generation system 314 and transaction authorization system 316, which receive the token request and extract the credit card data. Token generation system 314 can then determine whether the credit card is valid, such as by submitting the transaction for authorization through transaction authorization system 316 to card issuing bank or card network 318 or in other suitable manners. Authorization gateway 306 transmits the authorization request response to point of sale device 302.

Point of sale device 302 receives the authorization response and determines whether the authorization has been approved, the token has been denied, such as due to fraudulent credit card data, or other suitable data. If the transaction has been approved, the token is stored by token handling system 308 for subsequent merchant processing, or is otherwise used to approve the transaction and to perform suitable post-authorization processing. For example, a merchant may be required to submit transactions periodically for payment, to respond to requests for transaction verification, or to perform other suitable post-transaction processing. Likewise, transaction request system 310 closes out the transaction authorization request and approves the authorization if the authorization request indicates approval.

In operation, system 300 allows card reader system 304 to be interfaced with point of sale device 302 through an existing point of sale device 302 interface. This process allows card reader system 304 to be provided with proprietary card reading and encryption technology to prevent point of sale device 302 from receiving the unencrypted card data, and thus provides additional security and protection from point of sale device malware, viruses, or other programs from third parties that are seeking unauthorized access to credit card account number data.

Figure 4:
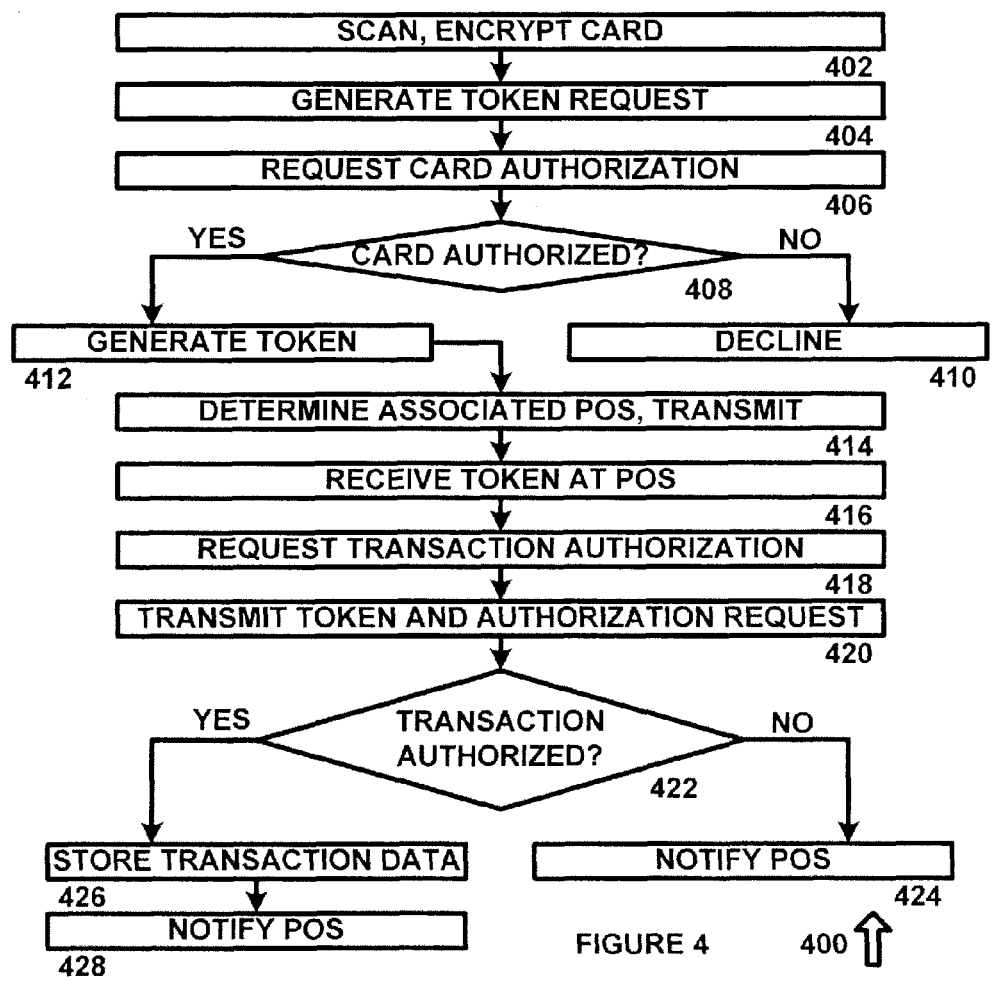
FIG. 4 is a flowchart of a method for processing a token request in accordance with an exemplary embodiment of the present invention.

FIG. 4 is a flowchart of a method 400 for processing a token request in accordance with an exemplary embodiment of the present invention. Method 400 can be implemented as a series of algorithms operating on a general purpose computer so as to transform the general purpose computer into a special purpose processing platform. While method 400 is presented as a flow chart, each method process can be implemented in software as an algorithm, and exemplary pseudo code is provided by way of example and not by limitation for various processes shown in method 400. Such exemplary pseudo code can be readily adapted to various similar processes as discussed herein for this or other methods or systems.

Method 400 begins at 402 where a credit card is scanned in a card reader system and encrypted. In one exemplary embodiment, the card reader system can be a card reader system that stands beside a point of sale device and which is an add on to the point of sale device, so as to allow the point of sale device's card reader to be bypassed or disabled, or to otherwise provide card reader functionality that does not allow unencrypted credit card account number data to be processed by a point of sale device. In one exemplary embodiment, the encryption can be performed by using a proprietary encryption technology that protects the credit card data from being intercepted by third parties, such as using a standard encryption process such as RSA or DES or a suitable proprietary equivalent. In addition to a magnetic card stripe reader, 402 can invoke an algorithm, such as the following exemplary pseudo code:

10 if card present, read magnetic stripe data
20 execute encryption process
30 store read data in buffer The method then proceeds to 404.

At 404, a token request is generated, and at 406, card authorization is requested. In one exemplary embodiment, the card reader can be a stand-alone card reader system that is located next to a point of sale device and that encrypts the credit card data, generates the token request, and generates the transaction identifier associated with a point of sale device, so as to allow the card to be authorized as part of the token generation process, and before a transaction amount is determined. In another exemplary embodiment, the card reader can be in line with the point of sale device, can interface through a data port of the point of sale device, or can otherwise be used in conjunction with a point of sale device. In this manner, the credit card reader can be a stand-alone system next to an existing point of sale device, or other suitable embodiments can be used. In one exemplary embodiment, 404 and 406 can invoke an algorithm, such as the following exemplary pseudo code:

40 generate token request
50 generate card authorization request
60 transmit token request, authorization request The method then proceeds to 408.

At 408, it is determined whether the card is authorized. In one exemplary embodiment, the token can be decrypted by an authorization gateway or suitable systems, and authorization processes using the credit card account number can be performed, such as a number validation check, a watch list check, transmission of the credit card number to a credit card network or card issuing bank for preliminary authorization, or other suitable processes. In one exemplary embodiment, 408 can invoke an algorithm, such as the following exemplary pseudo code:

70 execute authorization process

If it is determined that the card is not authorized, the method proceeds to 410 where a decline message is generated and transmitted to the point of sale device, card reader system, or other suitable systems. Otherwise, the method proceeds to 412 where a token is generated. In one exemplary embodiment, the token can be a number unrelated to the credit card data that is used to track the transaction and the credit card associated with the transaction so as to avoid storing and transmission of credit card data. In another exemplary embodiment, 410 and 412 can invoke an algorithm, such as the following exemplary pseudo code:

80 if card not authorized, generate decline message
90 if card authorized, generate token
100 transmit message or token The method then proceeds to 414.

At 414, the point of sale device associated with the token and the authorization request is determined, and the authorization request is transmitted to the associated point of sale device. In one exemplary embodiment, point of sale device can have a unique address identifier, and data packets or other suitable data formats can be generated and addressed to that point of sale device. In another exemplary embodiment, 414 can invoke an algorithm, such as the following exemplary pseudo code:

110 determine associated point of sale address
120 address authorization request message and transmit The method then proceeds to 416.

At 416, the token associated authorization request data is received at a point of sale device. In one exemplary embodiment, where only a token is generated, the token is received and the point of sale device proceeds with transaction preparation, such as using existing authorization processes that are normally performed using a credit card account number but where the token is used instead of the credit card account number. Likewise, where a predetermined amount has been authorized, the token can be received at the point of sale device and the transaction authorization information can be used to allow the transaction to be performed. In one exemplary embodiment, 416 can invoke an algorithm, such as the following exemplary pseudo code:

130 receive token, perform authorization processing

The method then proceeds to 418.

At 418, transaction authorization is requested. In one exemplary embodiment, a transaction authorization can be requested where an amount exceeds a predetermined transaction threshold that has already been authorized when the card was authorized, where a predetermined authorization processing method is performed, or using other suitable processes. In one exemplary embodiment, 418 can invoke an algorithm, such as the following exemplary pseudo code:

140 generate transaction authorization request

The method then proceeds to 420.

At 420, the token and transaction authorization request data is transmitted to the authorization gateway. In one exemplary embodiment, the token can be included in an authorization request response message in place of a credit card number so as to facilitate interfacing the transaction processing with the existing credit card authorization processes. In another exemplary embodiment, 420 can invoke an algorithm, such as the following exemplary pseudo code:

150 transmit token and transaction authorization request to authorization gateway The method then proceeds to 422.

At 422, it is determined whether the transaction has been authorized by the transaction gateway, card issuing bank, credit card authorization network or other suitable system. If the transaction has not been authorized, the method proceeds to 424 where a transaction refusal message is transmitted to the point of sale device, such as indicating that the credit card is stolen, that there are insufficient funds, or other suitable data. Otherwise, the method proceeds to 426 where the transaction data is stored at the authorization gateway, including the token number which is associated with the credit card data at the authorization gateway in a secure location, the transaction data such as transaction amount, items purchased, stored, purchased from, point of sale device number, or other suitable transaction data. The method then proceeds to 428 where the point of sale device is notified that the transaction has been authorized and can proceed. In one exemplary embodiment, 422-428 can invoke an algorithm, such as the following exemplary pseudo code:

160 transmit authorization request to card issuing bank over credit card authorization network
    170 if transaction not authorized generate denial message
    180 if transaction authorized, store transaction data generate approval message
    190 transmit message to point of sale terminal In operation, method 400 can be used to perform authorization processing with a stand-alone card reader system in an existing point of sale device. Method 400 may require the existing point of sale device to be updated to interface with token requests generated by the stand-alone card reader, and allows an authorization gateway to receive encrypted credit card data that has not been presented to or processed by the point of sale device, so as to insulate the credit card data from unauthorized access.

Figure 5:
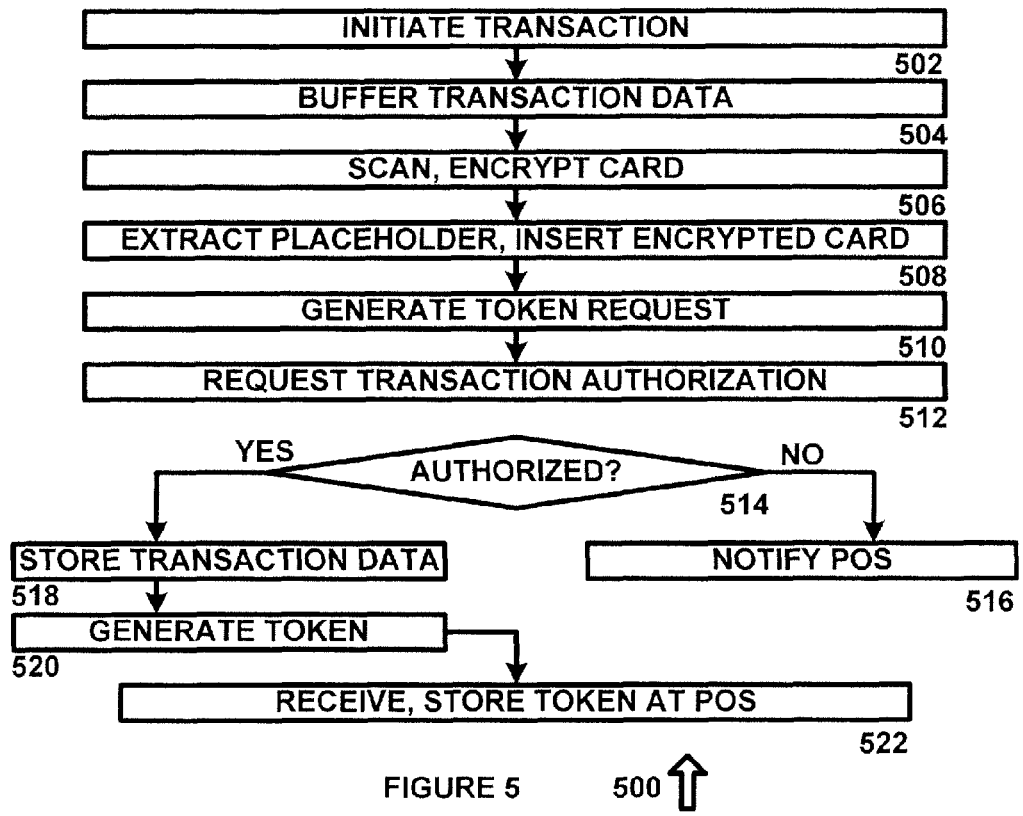
FIG. 5 is a flow chart of a method for processing transaction data in accordance with an exemplary embodiment of the present invention.

FIG. 5 is a flow chart of a method 500 for processing transaction data in accordance with an exemplary embodiment of the present invention. Method 500 can be implemented as a series of algorithms on one or more processing platforms so as to convert the processing platforms from general purpose computers into special purpose processors, such as by using code similar to the disclosed pseudo code for method 400 as modified to accommodate the processes of method 500.

Method 500 begins at 502 where a transaction is initiated. In one exemplary embodiment, the transaction can be initiated by a point of sale device, such as one that has not been modified and where the operator is using a specific or special operator identification card that inserts a placeholder code into the transaction data. In another exemplary embodiment, standard point of sale software can be used that monitors for the presence of a credit card account number from a magnetic card stripe reader, so that the existing system can be used without modification by using a credit card magnetic stripe surrogate. This surrogate can be a single device that is used by all employees, can be an employee-specific device that is used to identify the employee that is handling the transaction, or can be other suitable devices. The method then proceeds to 504.

At 504, the transaction data from the point of sale device is received. In one exemplary embodiment, the transaction authorization request can have a predetermined format, and can be buffered so as to identify the expected location of the placeholder code, which will be the location in the transaction authorization request format where the credit card account data would normally be. The method then proceeds to 506.

At 506, a credit card is scanned at a stand-alone card reader. In one exemplary embodiment, the stand-alone card reader can be downstream from the point of sale device and can include encryption software and other systems that are used to ensure the security of the credit card data and to prevent the credit card data from being extracted or detected by unauthorized third parties. The credit card data is then encrypted and the method proceeds to 508.

At 508, the placeholder code from the transaction authorization packet is extracted and the encrypted credit card data is inserted in its place. In one exemplary embodiment, encrypted credit card data can include additional data such as a token request or other suitable data. In another exemplary embodiment, 508 can invoke an algorithm, such as the following exemplary pseudo code:

```
10  read buffer {field}
20  {field} = employee ID or other data?
    30  Yes - replace with encrypted card data, other
        data
    40  No - generate alert
50  continue
```

In this exemplary pseudo code, an alert is generated if the placeholder code is not an authorized employee ID or other authorized data, such as to generate an alert that an unauthorized person is attempting to submit a transaction for authorization. The method then proceeds to 510.

At 510, a token request is generated. In one exemplary embodiment, the token request can include the encrypted credit card account data that has been read from the magnetic stripe and other suitable data, such as a point of sale device identifier or other suitable data. The method then proceeds to 512.

At 512, transaction authorization is requested from an authorization gateway. In one exemplary embodiment, the authorization request can be transmitted to an authorization gateway, and the token request can be extracted and decrypted, such that the credit card validity and credit limit can be determined. Transaction authorization can be performed by transmitting a transaction authorization request to a card issuing bank, a credit card authorization network or other suitable systems, and receiving authorization approval or denial or in other suitable data. The method then proceeds to 514.

At 514, it is determined whether authorization of the transaction has been received from a card issuing bank, a credit card authorization network or whether other suitable transaction authorization data has been received. If the transaction has not been authorized, the method proceeds to 516 and an authorization denial code or other suitable data is transmitted to the point of sale device. Otherwise, the method proceeds to 518 where the transaction data is stored at the authorization gateway, such as to allow the token identifier, the credit card data, the transaction data, or other suitable data to be obtained in the future, to allow the merchant or card issuing bank to access such data in the future if required but to prevent third parties from accessing the data behind the secure firewall at the authorization gateway, or for other suitable purposes. The method then proceeds to 520.

At 520, a token is generated to identify the transaction, and the token is also stored with the transaction data. The method then proceeds to 522.

At 522, the token is received and stored at the point of sale device in addition to the authorization approval. In this manner, the point of sale device can use an adjunct or stand-alone magnetic card stripe reader and can receive authorization for a transaction without accessing the magnetic card stripe data.

In operation, method 500 allows an existing point of sale device to be used with an adjunct or stand-alone magnetic card stripe reader, such as to allow the existing authorization process and programming to be used, but by further substituting a placeholder or employee identifier in place of the credit card account number that is stored in the magnetic card stripe data. In this manner, additional security can be provided at point of sale devices without requiring any retrofit or modification of the point of sale software.

Figure 6:
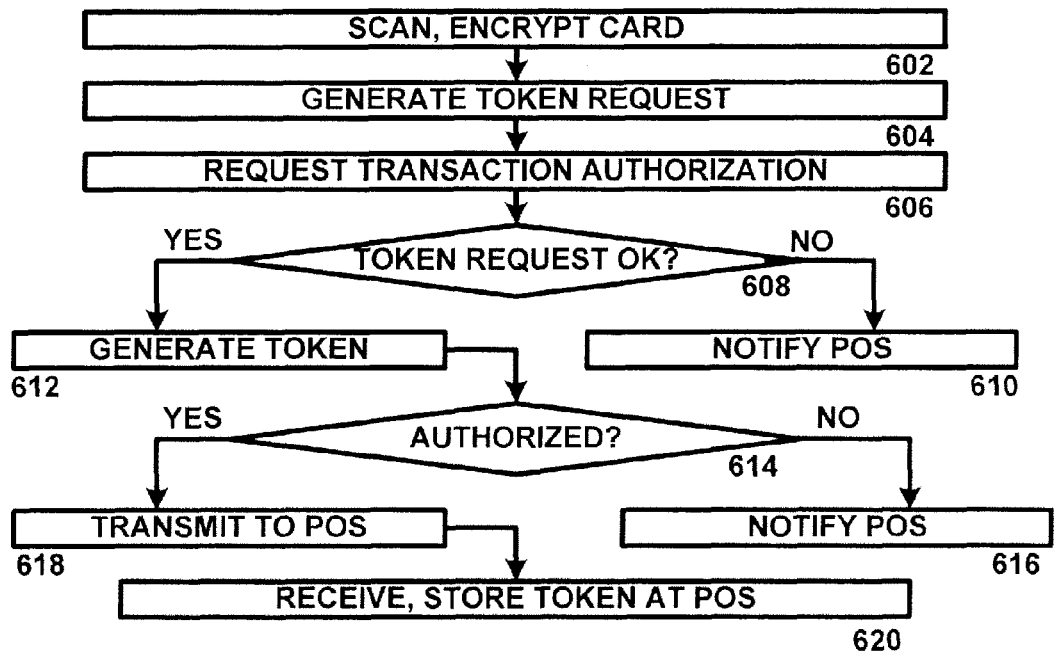
FIG. 6 is a flow chart of a method for processing authorization data in accordance with an exemplary embodiment of the present invention.

FIG. 6 is a flow chart of a method 600 for processing authorization data in accordance with an exemplary embodiment of the present invention. Method 600 can be implemented as one or more algorithms on one or more processing platforms, so as to transform this processing platform from general purpose processors into specific purpose processors, such as by using code similar to the disclosed pseudo code for method 400 as modified to accommodate the processes of method 600.

Method 600 begins at 602 where the magnetic stripe of a credit card is scanned and encrypted. In one exemplary embodiment, a stand-alone card reader system can be used to read and encrypt the magnetic stripe data from a credit card using a proprietary encryption process. The method then proceeds to 604.

At 604, a token request is generated. In one exemplary embodiment, the token request can include the encrypted credit card account data that has been read from the magnetic stripe and other suitable data, such as a point of sale device identifier or other suitable data. The method then proceeds to 606.

At 606, transaction authorization is requested. In one exemplary embodiment, a point of sale device can be interfaced with a stand-alone magnetic card stripe reader through a wireless interface, a data port (such as a RS232 port, a USE port, or other suitable ports), or in other suitable manners, and can receive the token request and process that request in addition to a transaction authorization request, such as by including the token request with the transaction authorization. The method proceeds to 608.

At 608, it is determined whether the token request is acceptable, such as at an authorization gateway that receives the transaction authorization request and token request, and which extracts the token request and decrypts the credit card data from the token request. The authorization gateway can be behind the secure firewall such that decryption and extraction of the credit card data can be secured from third parties. If it is determined at 608 that the token request is riot acceptable, such as by checking the credit card number for proper form, against a watch list or by running a preliminary authorization request to a card issuing bank, or using other suitable processes, the method proceeds to 610 where the point of sale device is notified that the authorization request has been denied. Otherwise, the method proceeds to 612 where a token is generated. The method then proceeds to 614. Likewise, if authorization is not performed prior to token generation, it is determined at 614 whether the transaction amount has been authorized. If the transaction has not been authorized, the method proceeds to 616 where the point of sale device is notified without the generation of a token. Otherwise, the method proceeds to 618 where the token and authorization request is transmitted to the point of sale device from the authorization gateway. The method then proceeds to 620.

At 620, the token and authorization response is received and stored at the point of sale device. In one exemplary embodiment, point of sale device can store a token number instead of the credit card data and associate that with the authorization transaction data, so as to allow the merchant to subsequently identify the token number if there are any questions about the transaction, and the token number can be used to identify the credit card that was presented for payment.

In operation, method 600 allows a point of sale device to be connected to an adjunct magnetic card stripe reader, and to receive encrypted credit card data from the magnetic card stripe reader, so as to replace the magnetic card stripe data with a token request that protects the magnetic card stripe data from ever being read from any point of sale device software or hardware. In this manner, commonly used methods that are used to extract credit card data at point of sale devices for unauthorized purposes are defeated and security of the credit card data is maintained.

Figure 7:
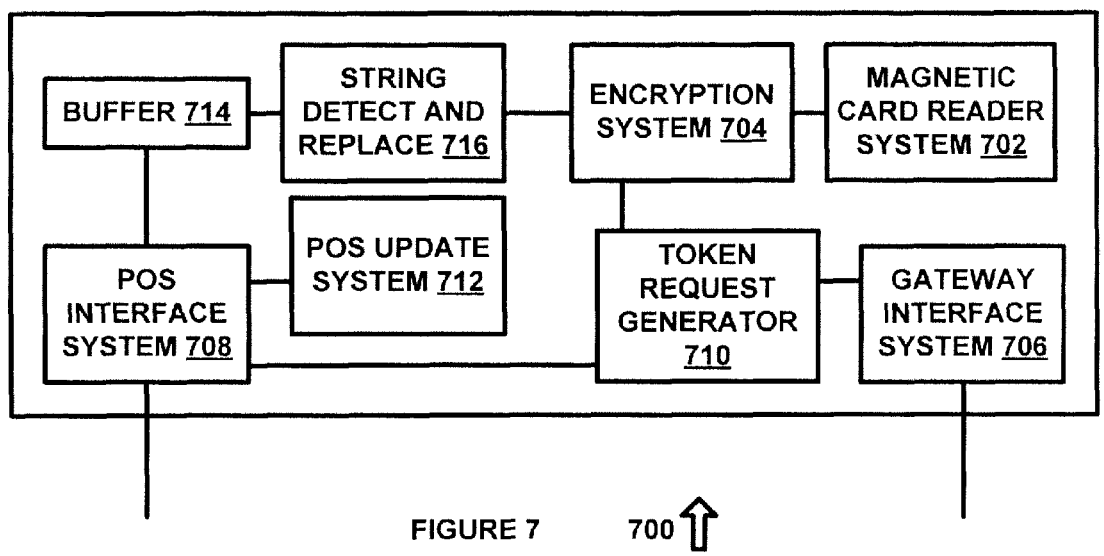
FIG. 7 is a diagram of a system for a stand-alone card reader for use with a point of sale device in accordance with an exemplary embodiment of the present invention.

FIG. 7 is a diagram of a system 700 for a stand-alone card reader for use with a point of sale device in accordance with an exemplary embodiment of the present invention. System 700 can be implemented in hardware or a combination of hardware and software and can be a stand-alone card reader system having hardware components such as a magnetic card stripe reader, data ports and a processor, and associated processing software.

System 700 includes magnetic card reader system 702, which can be a standard or proprietary magnetic card stripe reader that detects data stored on the magnetic card stripe and stores it in a buffer for further processing. Likewise, magnetic card reader system 702 can perform encryption on the card stripe data as it is extracted from the magnetic card stripe, such as in addition to encryption system 704 or using encryption system 704. In one exemplary embodiment, encryption system 704 can be the operating system that is used to operate magnetic card reader system 702 or other suitable systems.

Encryption system 704 generates encrypted data containing credit card data, such as a credit card account number. This encrypted data can be submitted to token request generator 710 and transmitted by gateway interface system 706 to an authorization gateway over a suitable data transmission medium. Likewise, a token request can be submitted from token request generator 710 through point of sale interface system 708 to a point of sale device, such as a point of sale device that is connected to the magnetic card reader system 702. In addition, encryption system 704 can provide the encrypted card data to string detect and replace 716. String detect and replace 716 can receive authorization approval request data from buffer 714, which can receive the authorization request from point of sale interface system 708 and store the authorization request in buffer 714. String detect and replace 716 can store the encrypted credit card data in a predetermined location of buffer 714, can search buffer 714 for a predetermined text string or alphanumeric string associated with the credit card data or can perform other suitable processes to replace placeholder data with encrypted credit card data.

In addition, point of sale interface system 708 can receive an authorization request from an existing point of sale device, such as by allowing the user to use an identification card that takes the place of a credit card or other suitable devices or systems, and where the authorization request has been modified by system 700 using the encrypted credit card data from encryption system 704. In this exemplary embodiment, point of sale interface system 708 can store the authorization request in buffer 714 or in other suitable locations.

System 700 can include point of sale update system 712, which can interface with a point of sale device through point of sale interface system 708 or in other suitable manners to update software that controls the operation of a point of sale device. In this exemplary embodiment, gateway interface system 706 can be used to receive point of sale updates based on point of sale identifiers associated with system 700. Likewise, other suitable processes can be used.

In operation, system 700 provides different exemplary embodiments for providing an adjunct card reader to an existing point of sale device, such as by using the adjunct card reader separately from the point of sale device, using it downstream from the point of sale device, between the point of sale device and an authorization gateway, or by interfacing the adjunct card reader with the existing point of sale device through a data port on the existing point of sale device casing or system hardware interfaces. In these exemplary embodiments, system 700 provides a flexible approach to updating existing point of sale devices to increase security of credit card data by removing known point of sale device configurations from being attacked by hackers.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for point-to-point encryption comprising:
 a card reader system
  for reading unencrypted card data stored on a magnetic stripe of a card and
  for encrypting the card data using a network key,
  the card reader system being contained in a first housing;
 a point of sale device coupled to the card reader system, the point of sale device being contained in a second housing separate from the first housing, the point of sale device having a user interface for obtaining a transaction amount;
 a transaction request system coupled to the card reader system for transmitting the transaction amount and the encrypted card data to an authorization gateway,
  wherein the unencrypted card data is prevented from being processed by the point of sale device; and
 an authorization gateway that comprises:
  a token generation system
   for receiving an unencrypted token request and the encrypted card data and
   for decrypting the encrypted card data; and
  a transaction authorization system
   for transmitting the decrypted card data to a card-issuing bank with an authorization request and
   for receiving an authorization response;
 wherein the token generation system generates a token based on the authorization response,
 wherein the card reader system comprises a token request system for compiling the encrypted card data into a token request for transmission to the authorization gateway,
 wherein the token request is unencrypted.

2. The system of claim 1 wherein the point of sale device comprises a token handling system for receiving the token from the authorization gateway, associating the token with transaction data and storing the token and the associated transaction data in a local memory.

3. The system of claim 1 wherein the point of sale device comprises a transaction permission system for receiving the token from the authorization gateway, associating the token with transaction data and transmitting the token and the associated transaction data to the authorization gateway.

4. The system of claim 1 wherein the point of sale device is only coupled to the card reader system through the authorization gateway.

5. The system of claim 1 wherein the point of sale device is only coupled to the card reader system through a data port of the point of sale device.

6. The system of claim 1 wherein the card reader system is coupled to the authorization gateway, and data from the point of sale device is only transmitted to the authorization gateway by passing through the card reader system.

7. The system of claim 1 wherein the transaction request system is for transmitting the transaction amount and the encrypted card data to an authorization gateway without decrypting the encrypted card data.

8. The system of claim 1 wherein the transaction request system is for encrypting the transaction amount and the encrypted card data for transmission to an authorization gateway without decrypting the encrypted card data.

9. A method for point-to-point encryption comprising:
 reading unencrypted card data stored on a magnetic stripe of a card at a card reader system contained in a first housing;
 encrypting the card data at the card reader system using a network key;
 obtaining a transaction amount from a point of sale device contained in a second housing separate from the first housing;
 transmitting the transaction amount and the encrypted card data to an authorization gateway without decrypting the encrypted card data prior to transmission;
 preventing the unencrypted card data from being processed by the point of sale device;

compiling the encrypted card data into a token request with unencrypted token request data for transmission to the authorization gateway at the card reader system;

receiving the token request and the encrypted card data at the authorization gateway;

decrypting the encrypted card data;

transmitting the decrypted card data to a card-issuing bank with an authorization request;

receiving an authorization response; and generating a token based on the authorization response.

10. The method of claim 9 comprising:

receiving the token from the authorization gateway;

associating the token with transaction data; and storing the token and the associated transaction data in a local memory.

11. The method of claim 9 comprising:

receiving the token from the authorization gateway;

associating the token with transaction data; and transmitting the token and the associated transaction data to the authorization gateway.

12. The method of claim 9 comprising coupling the point of sale device to the authorization gateway only through the card reader system.

13. The method of claim 9 comprising coupling the point of sale device to the card reader system only through a data port of the point of sale device.

14. The method of claim 9 wherein data from the point of sale device is only transmitted to the authorization gateway by passing through the card reader system.

15. A method for point-to-point encryption comprising:

reading unencrypted card data stored on a magnetic stripe of a card at a card reader system;

encrypting the card data at the card reader system using a network key;

obtaining a transaction amount from a point of sale device;

transmitting the transaction amount and the encrypted card data to an authorization gateway without decrypting the encrypted card data;

compiling the encrypted card data into a token request with unencrypted token request data for transmission to the authorization gateway at the card reader system;

receiving the token request and the encrypted card data at the authorization gateway;

decrypting the encrypted card data;

transmitting the decrypted card data to a card-issuing bank with an authorization request;

receiving an authorization response; and generating a token based on the authorization response.

16. The method of claim 15 comprising compiling the encrypted card data into the token request for transmission to the authorization gateway at the card reader system.

* * * * *